July 1, 1941.  R. H. JORDAN  2,247,707
KITCHEN UTILITY DEVICE
Filed Nov. 23, 1938  8 Sheets-Sheet 1
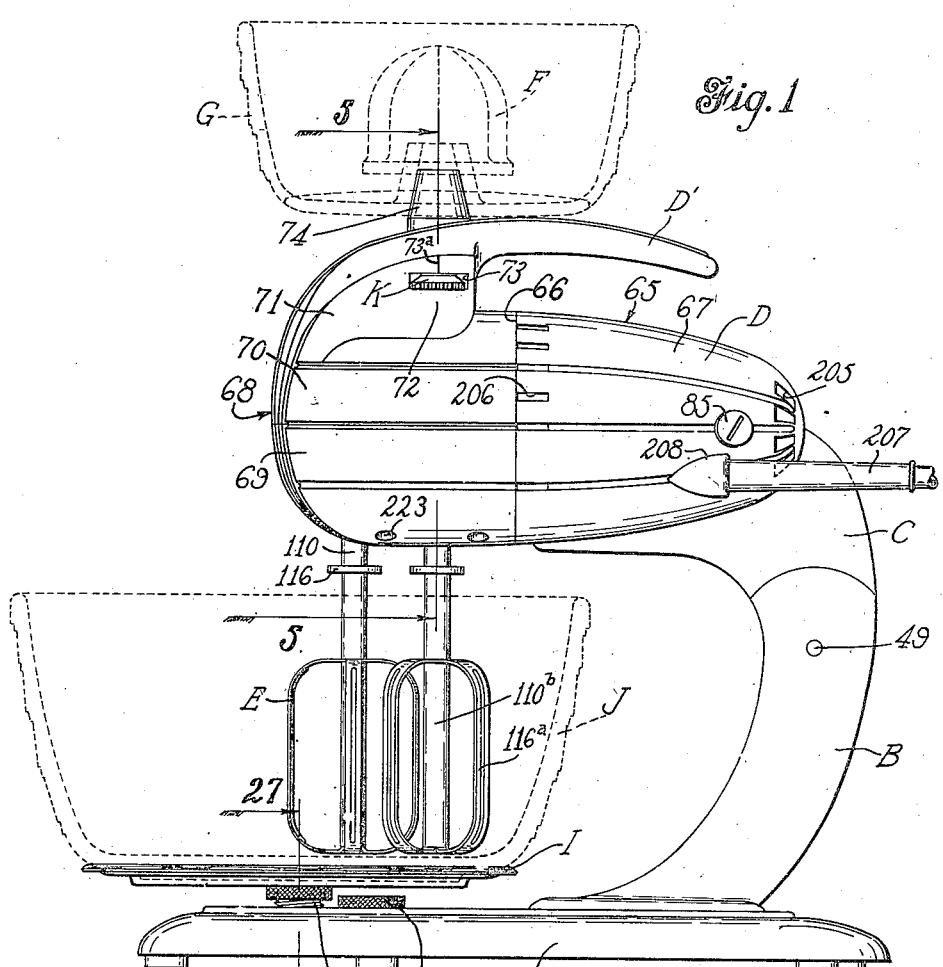
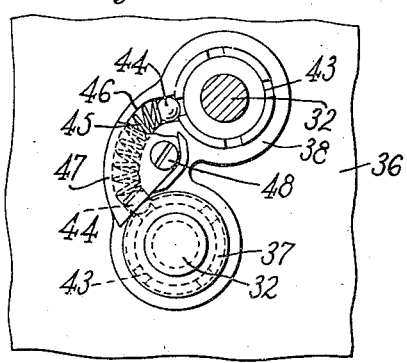
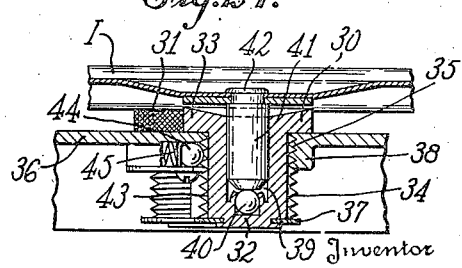

July 1, 1941.   R. H. JORDAN   2,247,707
KITCHEN UTILITY DEVICE
Filed Nov. 23, 1938   8 Sheets-Sheet 2

Inventor
Richard H. Jordan
By Rockwell & Bartholow
Attorneys

July 1, 1941.     R. H. JORDAN     2,247,707
KITCHEN UTILITY DEVICE
Filed Nov. 23, 1938     8 Sheets-Sheet 3

Inventor
Richard H. Jordan
By Rockwell T. Bartholow
Attorneys

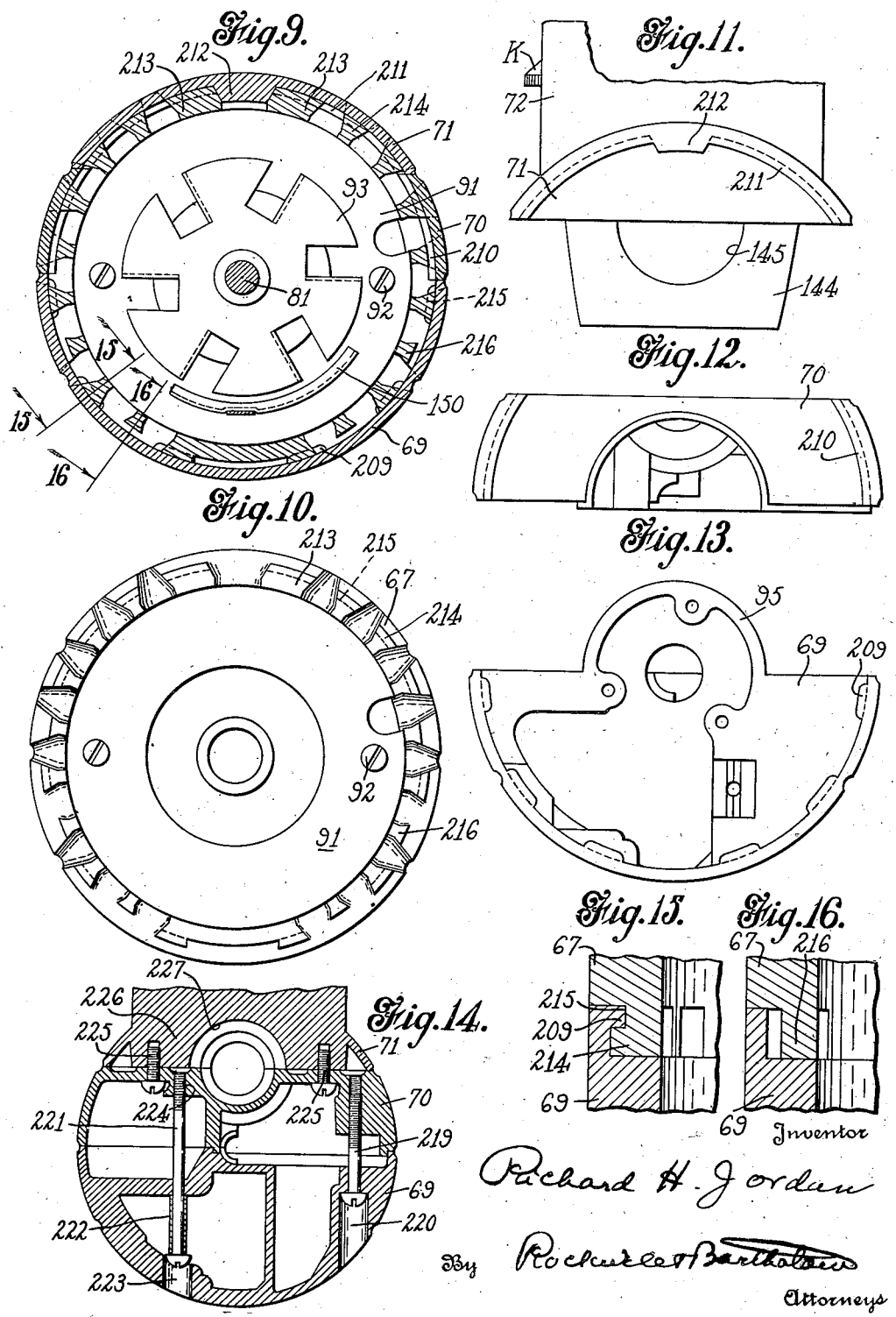

July 1, 1941.  R. H. JORDAN  2,247,707
KITCHEN UTILITY DEVICE
Filed Nov. 23, 1938   8 Sheets-Sheet 5

Inventor
Richard H. Jordan
By Rockwell & Bartholow
Attorneys

July 1, 1941.  R. H. JORDAN  2,247,707
KITCHEN UTILITY DEVICE
Filed Nov. 23, 1938  8 Sheets-Sheet 6
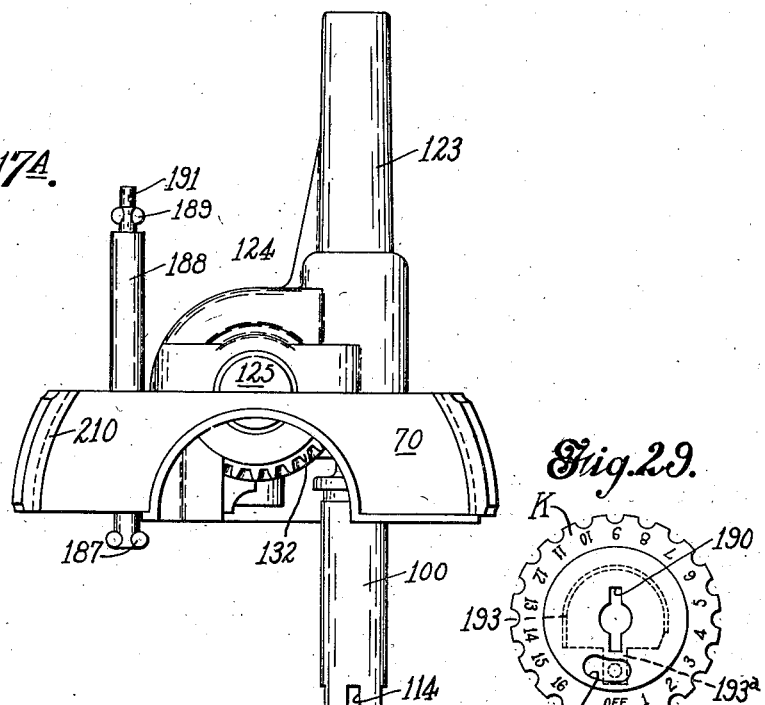
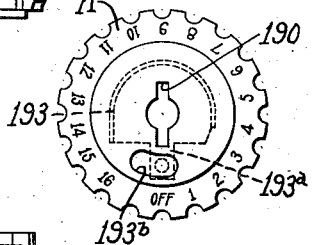
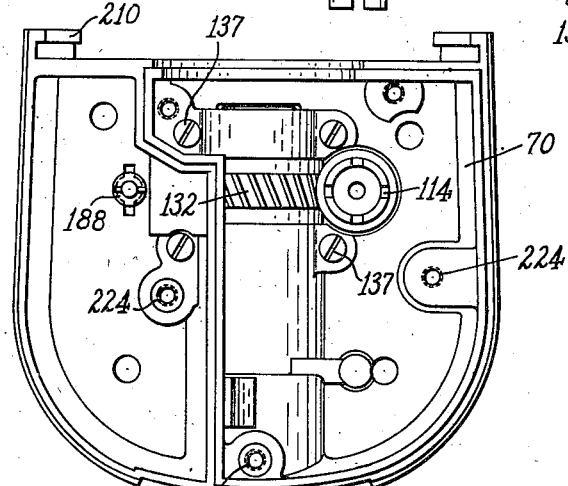
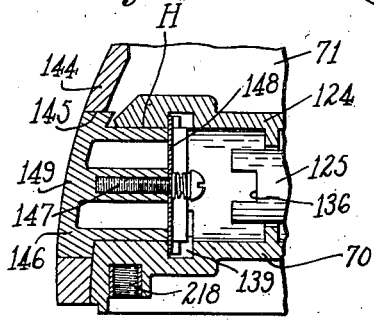
Inventor
Richard H. Jordan
By Rockwell Bartholow
Attorneys

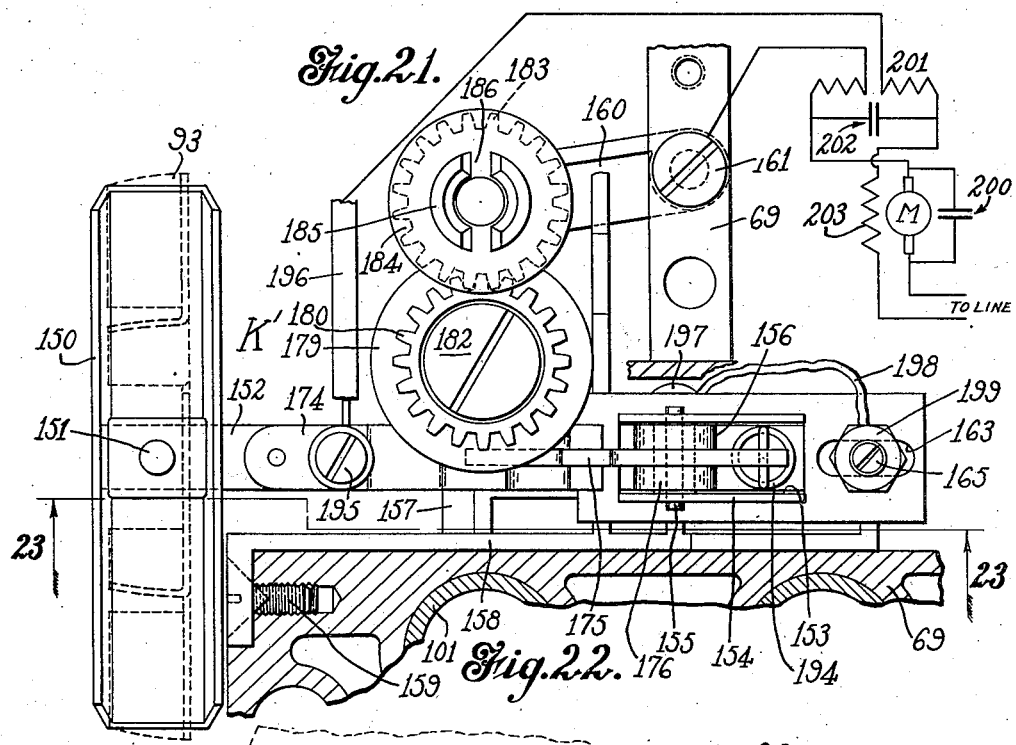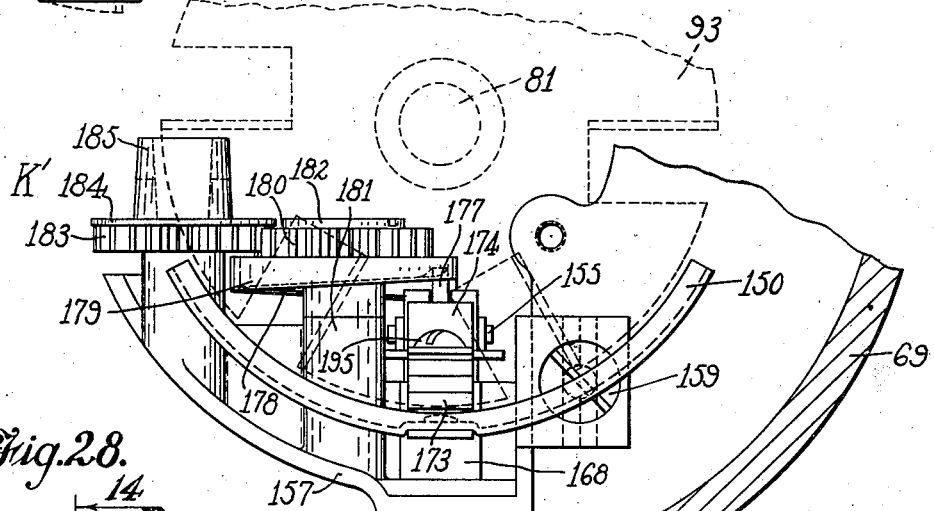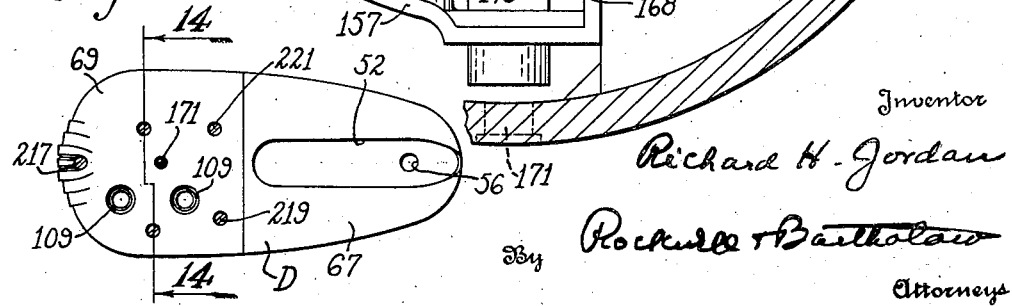

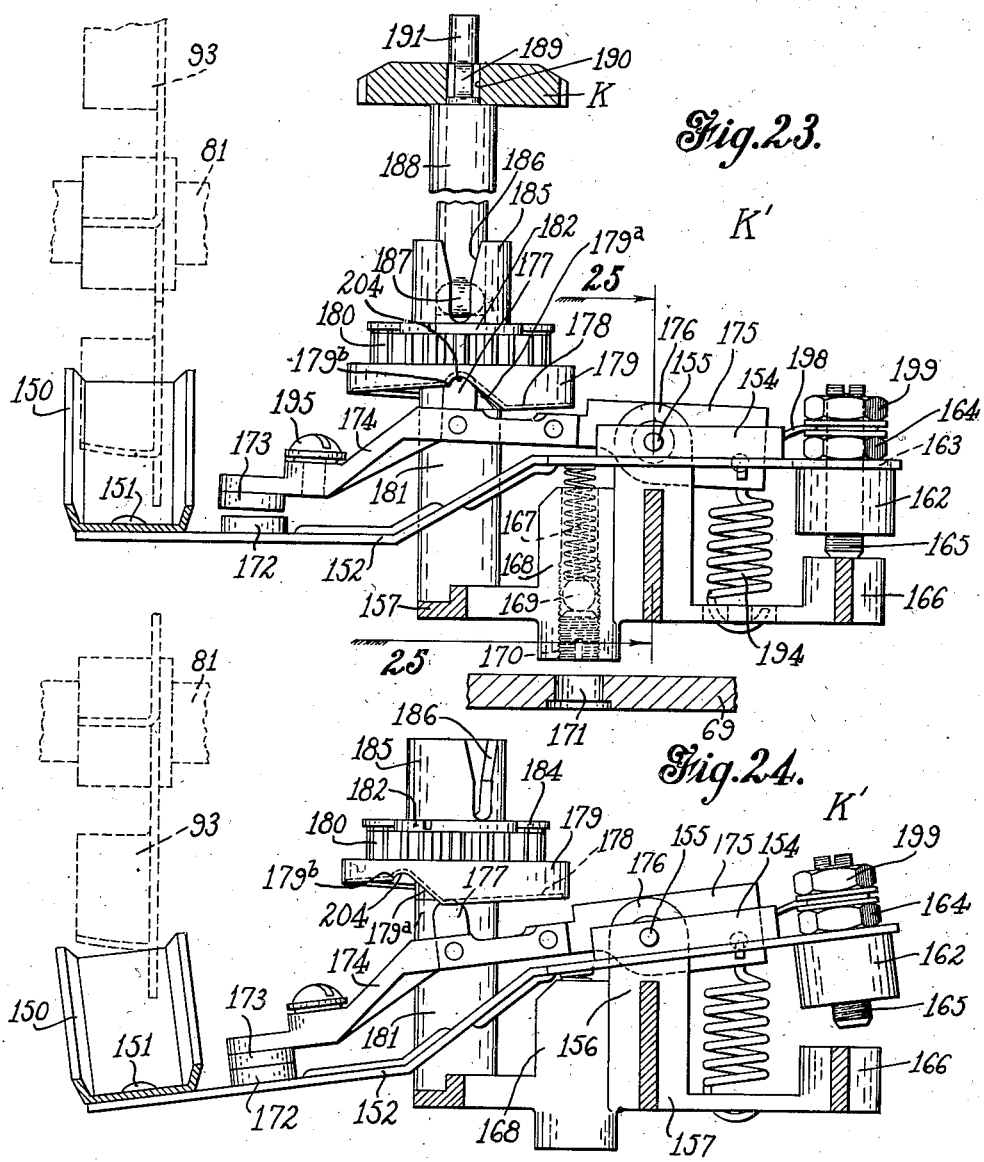

Patented July 1, 1941

2,247,707

UNITED STATES PATENT OFFICE 2,247,707

KITCHEN UTILITY DEVICE

Richard H. Jordan, Hamden, Conn., assignor to
The A. C. Gilbert Company, New Haven, Conn.,
a corporation of Maryland Application November 23, 1938, Serial No. 241,966

6 Claims. (Cl. 259—104)

This invention relates to electric motor-operated kitchen utility devices for mixing, beating and extracting edible products.

The invention has particular reference to devices of the general type disclosed in Patent No. 2,027,036 of Alfred C. Gilbert and Shirley P. Morse, in which there are provided a pair of mixing or beating agitators adapted to operate in a rotatably supported mixing bowl, a juice reamer adapted to operate in a juice-collecting and discharging bowl, and a power shaft, said power shaft having associated therewith a socket or outlet for the connection of various appliances, such as food choppers, coffee grinders, ice cube breakers, and the like.

One object of my invention is to improve the construction of devices of the type above mentioned, more particularly with the object of increasing their power and efficiency and their convenience and range of use.

Another object is to improve the general organization of the parts or members of such devices in a manner that lends itself particularly well to a stream-lined device which is not only attractive in appearance but is easier to keep clean, and, furthermore, to a device which is of composite construction in that, while the main working parts are of metal, the casing enclosing the motor and gearing is of plastic material, and therefore non-rusting and light in weight, although on the other hand the construction is amply strong and rugged to do the work for which it is intended, and to withstand wear.

These improvements in the general organization of parts have particular relation to the manner of dividing the motor and gear casing and securing the parts together with relation to each other and to the supporting handle, to the general arrangement of the juicer shaft and power shaft assembly, and similar features.

It is aimed to improve the details of the device in such features as the means for controlling the upward and downward swinging of the motor member on its pedestal, the means permitting vertical adjustment of the turntable on which the mixing bowl is supported, the manner of constructing and mounting the beaters or agitators, and other features referred to as the description proceeds.

In the accompanying drawings:

Fig. 1 is a side elevation of a kitchen utility device embodying my improvements, showing the mixing bowl in dotted lines, and the juice-collecting bowl also in dotted lines;

Fig. 9 is a section on line 9—9 of Fig. 4;

Fig. 10 is a front end elevation of the rear section of the motor member with its associated parts as it appears before assembly with the front parts of the motor member;

Figs. 11, 12 and 13 are rear views of the upper, middle and lower members, respectively, of the front section or part of the motor member;

Fig. 14 is a transverse section on line 14—14 of Fig. 28;

Figure 3:
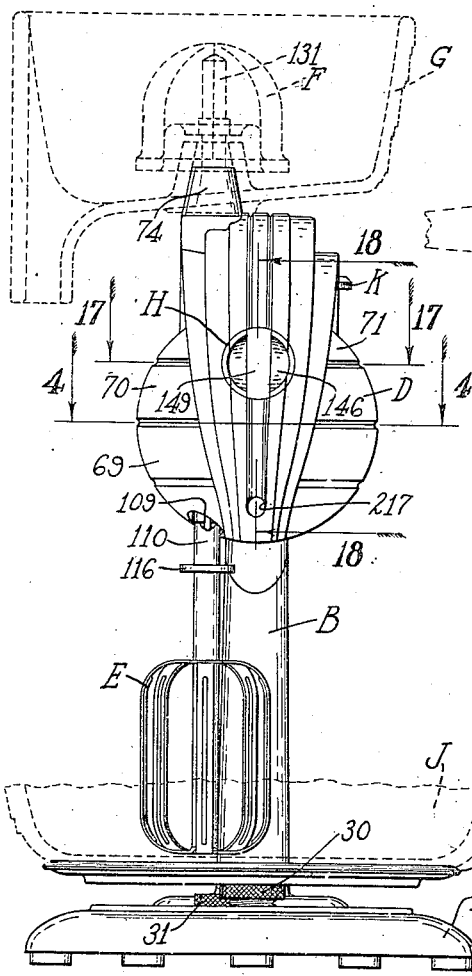
Fig. 3 is a front elevation of the device, with the juice bowl in dotted lines.
Figure 17:
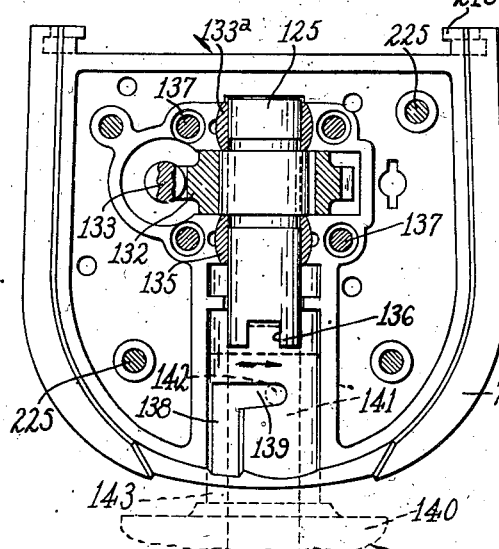
Figure 18:
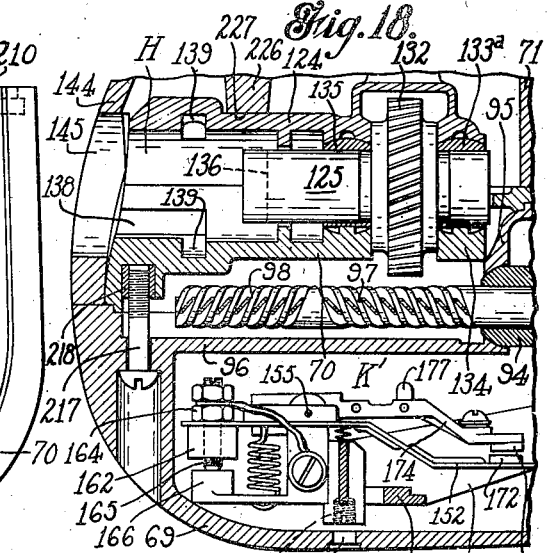
Figure 19:
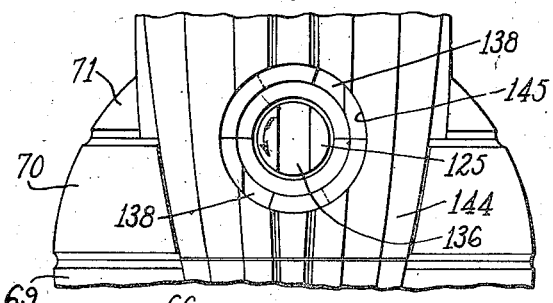
Figure 20:
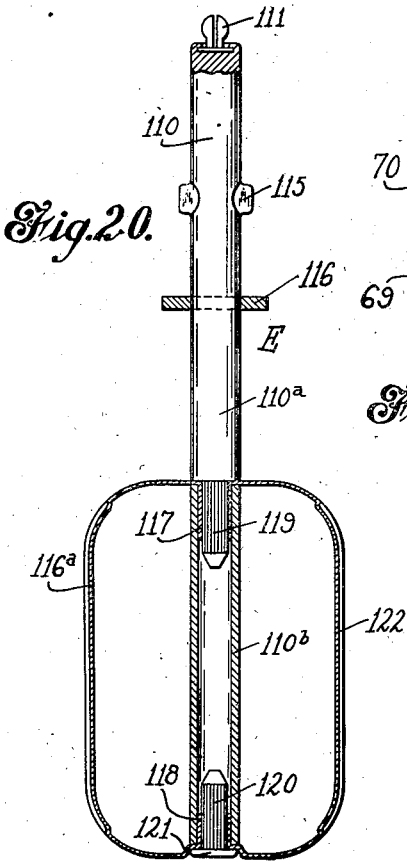
Figure 10A:
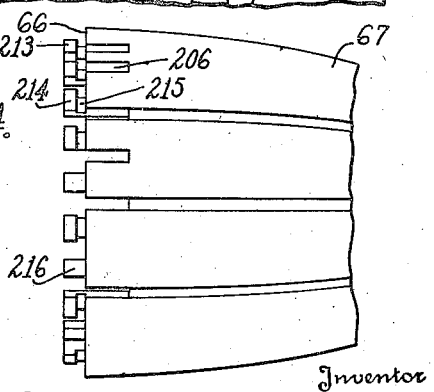
Fig. 10A is a fragmentary side elevation of the member shown in Fig. 10.

Figs. 15 and 16 are detail sections on lines 15—15 and 16—16, respectively, of Fig. 9;

Fig. 17 is a section on line 17—17 of Fig. 3;

Fig. 17A is a rear elevation of the middle member of the front section showing it carrying the juicer shaft and power shaft assembly;

Fig. 17B is a bottom plan view of the parts shown in Fig. 17A;

Fig. 18 is a section on line 18—18 of Fig. 3;

Fig. 19 is a front elevation of a portion of the motor member showing the power socket;

Fig. 19A is a detail section showing the closing plug mounted in the power socket;

Fig. 20 is a detail section of one of the beaters;

Fig. 21 is a top plan view on a larger scale of the governor assembly, showing also the arrangement of the motor circuit;

Fig. 22 is a rear view of the governor assembly;

Figs. 23 and 24 are sections (on line 23—23 of Fig. 21) of the governor mechanism showing the parts in different positions, respectively;

Fig. 25 is a section on line 25—25 of Fig. 23;

Fig. 26 is a detail bottom view of a portion of a base showing the mixing bowl adjusting means;

Fig. 27 is an enlarged section on line 27—27 of Fig. 1;

Fig. 28 is a bottom plan view of the motor member on a smaller scale; and

Fig. 29 is a detail plan view of the switch-operating member.

In its general features the device particularly selected for illustration and description comprises a base adapted to support a rotary turntable on which a mixing bowl is placed; a pedestal rising from the base; a bracket pivoted to the pedestal to swing in a vertical plane and in a position to overhang the base; an electric motor member detachably supported on top of the bracket, and having a gear casing and gearing located at the outer end thereof; agitator or beater shafts depending from the gear casing and adapted to extend down into the mixing bowl to stir its contents; an extractor or reamer shaft extending upwardly from the gear casing and adapted to drive a reamer located in a juice-collecting and delivering bowl; and a power shaft having a power socket or outlet associated therewith, which power shaft is driven by the gearing in the gear casing at a reduced speed, and is adapted to operate food choppers and like appliances which require considerable power.

In the example selected for illustration and description, the base is indicated generally at A, the pedestal at B, the pivoted bracket at C, the motor member, which encloses the motor and also the driving gears, at D, the depending agitators or beaters at E, the fruit reamer at F, the juice-collecting bowl at G, and the power socket at H. On the base A is a rotary turntable I adapted to support a mixing bowl J in which the beaters E operate. The motor member D has a detachable connection with the bracket C and is provided with a handle D' by means of which it can be held by the hand of the operator when detached from its support. An electric switch having an operating member K located adjacent handle D' controls the starting and stopping of the electric motor and the speed at which the motor is operated.

Figure 2:
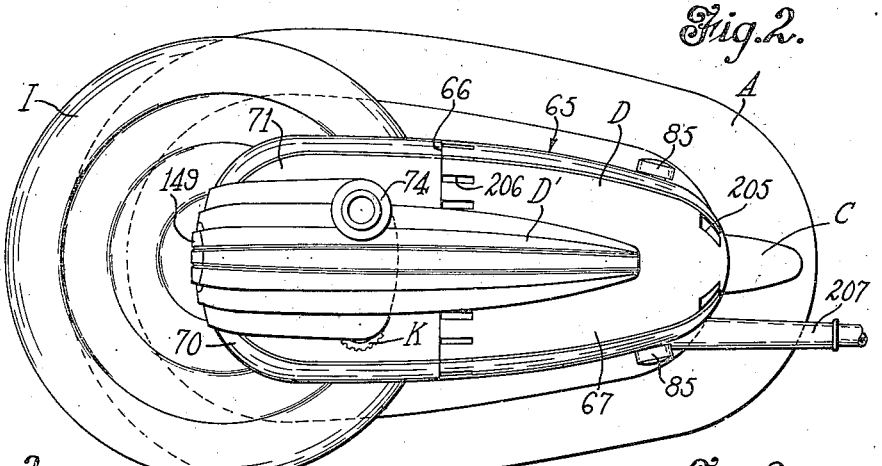
Fig. 2 is a top plan view of the device shown in Fig. 1.

The base A is equipped with two socket members 30 and 31, either of which is intended to support a mixing bowl rotatably through the medium of the turntable I. When the latter is mounted in the member 30, the bowl J, which is a large bowl, will be located relatively to the agitators E in the manner indicated in Figs. 1 and 2, it being noted that the shafts of the agitators E are disposed in a plane offset from and substantially parallel to a vertical plane passing lengthwise through the motor member at the center thereof. The socket member 30 is preferably in line with the vertical center plane of the motor member, which plane also passes through the center of pedestal B. The socket member 31 is somewhat offset, and closer to the pedestal, and enables a smaller bowl (not shown) to be mounted on the turntable in a somewhat different relation to the agitators.

The socket members 30 and 31 are mounted in the base A for vertical adjustment in the manner shown in Figs. 26 and 27. Each socket member is of cup-shaped formation having a closed bottom portion 32 and an upper lateral flange or rim 33. The outer surface of the socket member body is provided with screw threads 34 engaging a tapped hole 35 in the upper wall 36 of the base member, so as to be capable of being screwed upwardly and downwardly therein. The bottom portion of the socket member is surrounded by a washer 37 clinched in an annular groove and acting as a stop which abuts shoulder 38 to limit upward adjustment of the socket member, whereas downward movement of the socket member is limited by the flange 33 coming in contact with the upper surface of the base. The socket member has a socket 39 in the bottom of which is clinched an anti-friction ball 40 adapted to support from below a swiveling pin 41 carried by the turntable I and introduced into the socket member. The swiveling pin 41 is non-rotatably connected as by riveting to the turntable body, as indicated at 42, and the exterior side surface of the pin 41 engages the inner surface of socket 39, while the lower reduced end of pin 41 rests on the ball 40. In this manner the turntable is mounted for very free rotation in the socket member, although tipping is effectively prevented.

For convenience in turning each socket member for the purpose of raising and lowering it, the side surface of flange 33 is roughened as by knurling.

For the purpose of preventing the socket member when adjusted from being shifted out of its adjustment by the slight vibration of the machine, or otherwise, I have provided means for preventing angular movement of the socket member except when it is desired to adjust the same. Preferably this means takes the form shown in Figs. 26 and 27, wherein the socket member has the threads of its body interrupted by exterior longitudinal grooves 43, of which four are employed in the example shown. In association with each socket member is a spring-pressed device such as a ball 44 adapted to be pressed into any one of these grooves. In the form shown a helical spring 45 is common to the two balls 44, being interposed between them, as shown in Fig. 26, so as to press one ball into a groove of one socket member and the other ball into a groove of the other member. To enable this to be accomplished, the spring 45 is arranged in a curved groove 46 at the under portion of the base, and is held in place in said groove by a cap plate 47, which in turn is held in place by a screw 48, as shown in Fig. 26. It will be noted that by this arrangement the ball has a strong tendency to arrest rotation of the socket member at each quarter revolution, at which time it is pressed into one of the longitudinal grooves, and in this manner the socket member, when once adjusted to give the proper vertical adjustment to the turntable, will not readily come out of adjustment. The advantage of adjusting the turntable vertically arises from the fact that in this manner the distance between the bowl bottom and the bottoms of the agitators E can be adjusted so as to be best suited to the particular operation of mixing, beating or the like, which is taking place.

Figure 6:
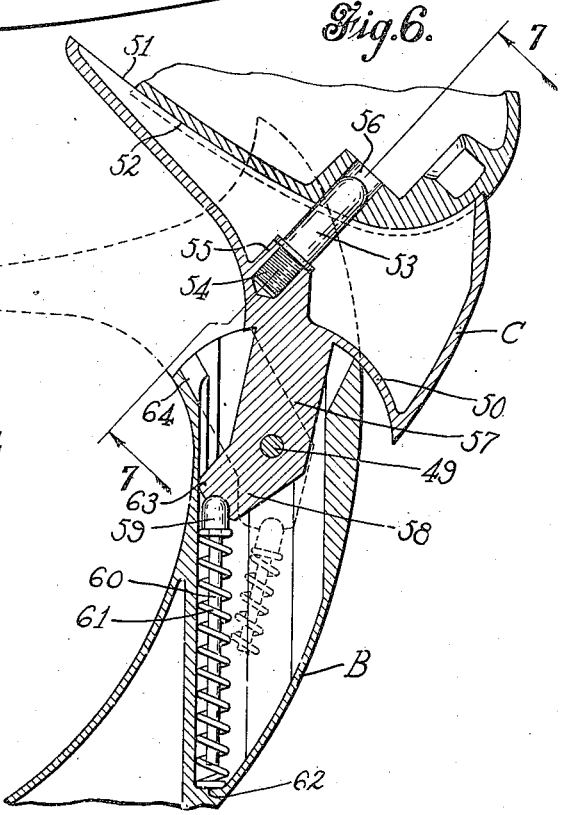
Fig. 6 is an enlarged vertical sectional view of a portion of the pedestal, the pivoted bracket, and a portion of the motor member, showing the motor member swung to the upper limit of its movement.
Figure 7:
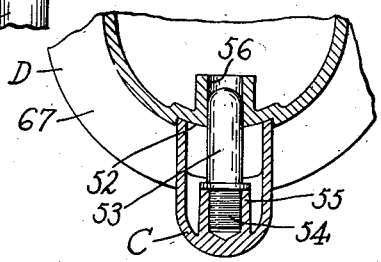
Fig. 7 is a detail section on line 7—7 of Fig. 6.

The pedestal B and base A are preferably constructed of metal, pedestal B being of hollow construction and suitably attached to base A, and having therein adjacent its upper end a flush pivot pin 49 which serves for pivoting the bracket C. The bracket C comprises a hollow metal shell formed so as to provide in effect an extension of the pedestal, and this shell is closed at the bottom, as shown at 50, and open at the top, as shown at 51, where it underlies and conforms to the surface of motor member D, occupying a groove 52 in the surface of the motor member, as shown in Figs. 6 and 7. A pin 53 having a smooth body and a rounded smooth top is screwed at its lower end portion 54 into a socket 55 rising from the bottom of bracket C, and the upper end portion of this pin, which extends upwardly somewhat above the upper edge of the open top portion of the bracket, and which is substantially vertically disposed when the parts are in the position shown in Fig. 1, has its upper end in engagement with a cylindrical socket 56 provided in the lower wall of motor member D. In this manner the motor member is held from lateral or longitudinal dislocation with respect to the bracket, but the motor member, when the handle D' is grasped by the hand, can be readily lifted off of the bracket so that the motor member can be used separately from its support.

The pivot pin 69, previously mentioned, pivots the bracket to the pedestal so that the former can swing in a vertical plane, and for this purpose said pivot pin engages a depending lug 57 integral with the bottom of the bracket, the pivot pin being in the open end portion of the hollow pedestal, and being disposed approximately midway of the length of lug 57, through which it extends. Lug 57 has an angularly offset portion 58 at its lower part, with a lower socketed face adapted to be engaged by the head 59 of a plunger 60, acted on by a compression screw 61 interposed between said head and an abutment 62 located within the pedestal.

The action of the plunger, acted on by the compression screw to exert spring pressure on the lower end portion of lug 57, is such that when the parts are in the position shown in Fig. 1, upward tilting of the bracket is resisted somewhat by the spring until the bracket has passed a certain position, after which the upward swing of the bracket is facilitated and the bracket urged into and resiliently held in its most elevated position, as shown in full lines in Fig. 6. Thus when the bracket is moved to its uppermost position, it is reliably held in that position, and will not readily be displaced. The reason for this action is that the lower end portion of lug 57 and the spring-pressed plunger form together a sort of toggle, which tends to swing, under spring pressure, to one side or the other of a central position.

Upward movement of the bracket beyond the position shown in Fig. 6 is prevented by the impingement of a toe portion 63 of the lug 57 against the inner surface of the pedestal, and movement of the bracket in a downward direction is arrested by impingement of the upper front portion of the upper part of lug 57 against a conforming surface 64 within the upper end of the pedestal.

Referring now to the construction of the motor member D, it will be noted that the same comprises an approximately oval casing, preferably constructed of Bakelite, or other suitable plastic material, which can be molded in the desired form, and made in sections, which with their contained mechanical parts are secured together to form the completed motor member. The casing, which is indicated at 65, is divided transversely at line 66 to form a rear section 67, given up for the most part to housing the motor, and a front section 68 containing, with other parts, gearing for driving the agitators and the reamer shaft. Front section 68 in turn is divided horizontally so as to form three parts, namely, lower part 69, intermediate part 70, and upper part 71. It is to the last-named part 71, that the handle D' is attached, and the handle is likewise preferably of plastic material, being molded integrally with part 71, from which it extends rearwardly in a location above part 65 so as to overhang the same. Adjacent the location where the handle D' is joined to the casing, a hollow enlargement or chamber 72 is provided, in which switch-operating member K is disposed, said member preferably being in the form of a rotary knurled disk projecting somewhat to the exterior of the casing through a slot 73 therein. This switch-operating disk is preferably disposed at one side of the casing so that when the handle D' is grasped by the hand of the operator, his thumb will conveniently lie over the disk in a position to actuate the same readily. At the opposite side of the casing, that is to say, at the opposite side of the handle with respect to the switch-operating member, the enlarged chamber portion 72 of the casing has joined thereto an upwardly projecting sleeve member or collar 74, preferably molded integrally therewith. The outer surface of this sleeve member is beveled, as shown particularly in Figs. 1 and 3, and is adapted to have seated thereon the correspondingly shaped socket portion of the juice bowl G.

Figure 4:
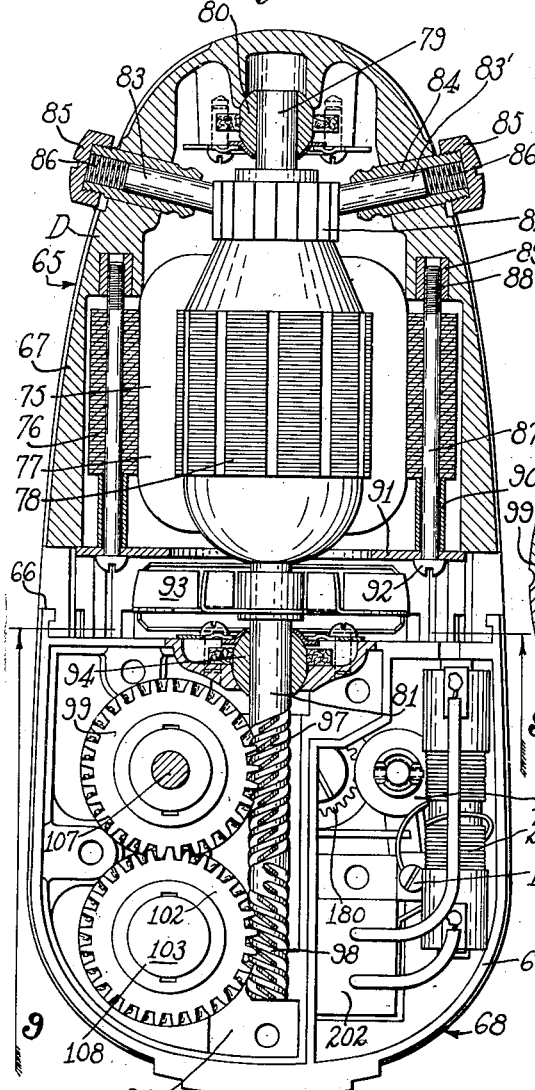
Fig. 4 is a horizontal section on line 4—4 of Fig. 3.

The arrangement of the motor in the rear section 67 of the casing is shown in Fig. 4. The electric motor, which for the most part is of usual construction, is indicated at 75, the same having a field magnet structure 76 with field windings 77, an armature 78, and a shaft 79. Within the rear closed portion of casing section 67 is mounted a rockably adjustable bearing 80 receiving the rear extremity of the motor shaft 79. The motor shaft is of considerable length, having a portion 81 extending into the front compartment of the casing for driving the gearing. The armature 78 is provided at the rear with a commutator 82 contacted by brushes 83 supported from the casing. The brushes proper are constituted by cylindrical bodies 83', sliding in metal tubes 84, each of which projects at one end to the exterior of the casing, and at the opposite end into the interior of the casing. These tubes are fixed permanently in the casing by being molded directly in the casing wall. Screwed to the outer ends of the tubes are caps 85, and between the under surfaces of these caps and the brush bodies helical springs 86 are confined, which urge the brushes against the commutator.

It is important to note that in my improved construction, as shown in Fig. 4, the brush bodies, instead of being perpendicular to the commutator axis, are arranged at a slight angle thereto. There is a brush at each side of the casing, and each brush has its inner end located slightly in advance of its outer end, the axis of the brush being at a slight angle to a plane extending transversely of the commutator. This arrangement has an important advantage in practice, in that the brush body is prevented from turning on its axis during rotation of the motor armature and hence is permanently held with its curved end in proper conformity to the commutator surface.

The field magnet core 76, which is laminated, as shown, is held in place in compartment 67 of the casing by means of screws 87. These screws are threaded at their inner extremities, as shown at 88, and these extremities screw into small metal sleeves 89 molded in place in the casing wall. In front of the laminations of the core, the screws 87 are surrounded by spacing collars 90 that space from the core a ring 91 of suitable insulating material such as fibre. The heads 92 of these screws are disposed at the outer face of ring 91.

Outside of the ring 91 but in proximity thereto, the shaft portion 81 of the motor has fixed thereto a fan or air impeller 93, which acts as a means for ventilating the motor, and also in connection with other devices as a means for regulating the motor speed. Adjacent this impeller the motor shaft is provided with a bearing similar to that used at the rear end, comprising a rockable bearing member 94 through which the shaft extends. This bearing is supported and carried by the lowermost part 69 of the front section of the motor casing, and it is for the purpose of mounting this bearing that said part 69 is provided at its rear end with the upward extension 95, shown in Fig. 13. The part 69 has an upper wall 96 over which lies the forward end portion of the motor shaft, which end portion is in this location provided with the oppositely directed worms 97 and 98, which are preferably formed therein by cutting of the shaft. The worm 97 engages a fibre worm gear 99 having a shaft 100 operating in a metal sleeve or bushing 101 set in wall portion 96, and extending downwardly within casing part 69. Similarly, worm 98 engages a fibre gear 102 having a shaft 103 supported in a sleeve or bushing similar to bushing 101. The fibre gears are pinned to their shafts by pins 105 projecting from the respective shafts into slots provided in rings 106 constituting liners for the fibre gears.

Figure 5:
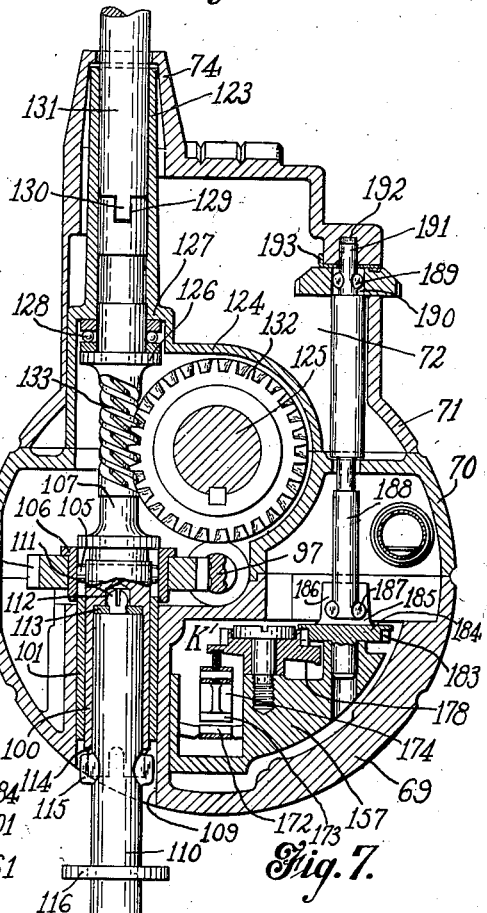
Fig. 5 is a vertical section on line 5—5 of Fig. 1.

The shaft 100, through the pin and slot connection just described, is driven from the worm gear 99, and this shaft at its lower end drives one of the agitators E, and at its upper end has an extension 107, best shown in Fig. 5, acting as a reamer drive shaft and as a driving means for the power shaft. The shaft 103, driven by fibre gear 102, is similar to the shaft 100, but has no upward extension, and terminates in a head 108 disposed immediately above the fibre gear. Each of the bodies of shafts 100 and 103 is hollow or formed as a sleeve, and operates in its bushing in the casing, and the bushing stops short of an opening 109 in the bottom of the casing, into which opening the shank of the corresponding agitator E may be inserted for coupling the agitator to the corresponding shaft 100 or 103. The shank 110 of the agitator is of a diameter to fit within its hollow driving shaft, and the upper end of the shank is equipped with a stud 111, split vertically so as to have a certain amount of resiliency. This resilient stud is adapted to snap into engagement with a socket 112 in the body of the shaft 100 or 103 so as to fasten the agitator shank in place in its driving socket, although permitting the removal thereof by a slight pull when that is desired. The socket 112 in which the split stud 111 is held is formed in part by an annular member 113 held rigid with respect to the hollow shaft member by being riveted or clinched in place therein in the location shown in Fig. 5.

For the purpose of interlocking each agitator shank with its hollow shaft member so that the shank will be driven from the shaft, the latter is provided at its lower end with diametrically located slots 114 adapted to be engaged by small lateral lugs 115 pressed up from the body of the agitator shank. These lugs operate in the corresponding opening 109 in the bottom of the casing, for the purpose of permitting ready manipulation of the agitator, and more particularly its withdrawal from the driving socket when such is desired. The shank of the agitator is provided somewhat below the lugs 105 with a collar 116. This collar may be formed by a ring fitted over the agitator shank and suitably secured thereto, as by welding.

The agitator shank 110 is preferably of cylindrical form, as shown in Fig. 20. At its lower end it is provided with a beater in the form of two loops arranged in the plane of the shank and intersecting each other at right angles, these loops being constructed of pressed sheet metal. Each loop is constructed of two sheet metal pieces or beater elements 116ª each having its upper and lower ends curved in toward the shaft or shank, and there provided with tongues or tabs 117 and 118, tab 117 being at the top and tab 118 at the bottom. The body of the agitator shank is constructed in two parts, 110ª and 110ᵇ, the former of which is provided at its lower end with an integral knurled pin 119. The part 110ᵇ is of hollow cylindrical form, and the beater elements or blades 116ª are attached to the lower portion thereof by a knurled pin 120. In constructing the agitator, the tabs 117 at the upper ends of the beater elements are forced into and locked within the open upper end of member 110ᵇ by the pin 119, and similarly the tabs 118 are locked in the lower end of member 110ᵇ by the knurled pin 120. The pin 120 has a head 121 which holds the blades 116ª against the lower edge of member 110ᵇ. Preferably the blades are reinforced by providing each of the same in its vertical portion with a depression 122 so as to form a strengthening rib therein.

Reverting now to the mechanism driven from the upper end of hollow shaft 100, it will be seen that the extension 107 on this shaft is journaled at its upper end in a metal bushing 123 in the form of a long sleeve mounted in the upper part of the casing and having its upper end portion located within the casing collar 74, previously mentioned. Metal sleeve 123 is formed as an extension of a metal housing 124, which serves, among other things, as an upper bearing member for a horizontal power shaft 125. Adjacent the lower end of sleeve 123 the upright shaft portion 107 is provided with a flange or collar 126, and between this flange or collar and a shoulder 127, an anti-friction bearing 128 is interposed for the purpose of taking upward thrust on shaft portion 107. Within sleeve 123 the upper extremity of shaft portion 107 is provided with a diametrical slot 129 receiving a driving tenon 130 on a removable reamer shaft portion 131, which fits into sleeve member 123, and has rigidly attached to its upper end portion in any suitable or preferred manner the juice reamer F, previously mentioned.

The metal housing member 124, previously mentioned, is in general of semi-cylindrical formation, and is attached to and carried by the intermediate member 70 of the front casing section in the manner shown in Figs. 17A and 17B. Between it and the body or web portion of member 70 are provided the bearings for the power shaft 125, and said parts in conjunction also form the power socket H. Adjacent its rear end shaft 125 carries a worm gear 132, which is driven by an inter-engaging worm 133 cut directly in shaft extension 107. At the rear of worm wheel 132, the power shaft has a bearing 133ª between member 124 and a channel-shaped portion 134 in member 70, and in front of gear wheel 132 the power shaft has a similar bearing 135. The power shaft extends forwardly to a relatively slight extent beyond this last-mentioned bearing and is provided at its forward end with a diametrical slot 136 located within the power socket H and adapted to be engaged by a correspondingly formed tenon on the shaft of the food chopper or other appliance to be driven. Fig. 18 shows how the power socket is provided between the channeled portion 134 of member 70, which forms its bottom, and the metal housing member 124, which forms its upper wall. The member 124 is secured to the body or web of member 70 by suitable screws 137, having their heads disposed at the lower side of member 70, as shown in Fig. 17B.

In the wall of the power socket H longitudinal grooves 138 are provided at diametrically opposite points, one of these grooves being in the member 124 and the other being in the channeled portion of member 70. At the inner ends of the grooves 138 and at approximately right angles thereto are lateral grooves 139, which communicate with the longitudinal grooves. An accessory appliance to be driven from the power shaft is indicated by dotted lines at 140 in Fig. 17, the same having a shaft 141 adapted to have its tenon engaged in the groove 136 of the power shaft. Oppositely located pins or studs 142 on the bearing sleeve 143 of the accessory appliance are adapted to be engaged in the inner ends of the groove portions 139. It is a feature of my invention that the grooves in the power socket have the angularly disposed inner end portions 139 for the reception of the pins or studs on the accessory appliance, and also that the power shaft be driven in such a direction, as indicated by arrows in Figs. 17 and 19, that the pins 142 will be forced against the closed ends of their receiving grooves whereby the rotation of the power shaft will have the effect of more firmly seating the accessory appliance in the power socket and overcoming any tendency toward the dislocation thereof by vibration or otherwise.

It will be noted that the uppermost member 71 of the front casing section is provided at the front end with a depending wall portion 144 extending down over the front of member 70 to the front wall of the lowermost member 69, as shown in Fig. 18. In this wall portion or tab 144 is formed a round hole 145 in line with the body of the power socket proper. This hole 145 can be closed off in an appropriate manner when the power socket is not in use, and for this purpose an ornamental plug 146, such as shown in Figs. 3 and 19A, may be used. This plug is molded from plastic material, and is of substantially cylindrical shape, and has at its rear end, mounted on a screw 147, a spring-pressed crosspiece 148 extended at its ends beyond the body of the plug and adapted to be engaged in the grooves of the power socket wall, by rotation of the plug, for the purpose of locking the plug in place. At the front of the plug, the latter is provided with a crossbar 149 (Fig. 3) by means of which it may be rotated, and inserted into or removed from the mouth portion of the power socket.

In the lower member of the front casing section is located a governor or automatic switch mechanism K' for controlling the operation of the motor, said mechanism being operable from the operating member or disk K, previously referred to. Large views of this mechanism are shown in Figs. 21 to 24, inclusive. In its broader aspects this mechanism is similar to that disclosed in Patent No. 1,494,189 to Percy Russell and Edward Burke Wilford, dated May 13, 1924, but in many ways the present mechanism is an improvement. It is of the type in which there is combined with an electric motor, an electric switch for controlling the motor, an air-compressing device actuated by the motor, means operated by air from said device for alternately opening and closing the switch while the motor is in operation to maintain the motor speed substantially constant, and a device for adjusting the switch-actuating means to vary the motor speed. In the present instance the fan 93 on the motor shaft is arranged to blow air against a member 150 in the nature of a bucket in the form of a segment of a circle, and which in this case is located beneath the fan or impeller. The member or bucket 150 is rigidly attached as by means of a rivet 151 to the extremity of a lever 152 having a slotted portion 153 with struck-up cheeks 154, between which passes a pivot pin 155 by means of which lever 152 is pivoted on a post 156 on the metal frame 157 located in the section 69 of the casing. The frame 157 has a longitudinal member 158 attached in place adjacent a longitudinal wall of the casing by a screw 159. The frame 157 also comprises a portion 160 extending at right angles to portion 158 and attached to casing member 69 by a screw 161. At the rear end of the lever 152 the same is provided with a depending counterweight 162 adjustable therealong in a slot 163, said counterweight being clamped in position by a nut 164 on an adjustable stop screw 165 adapted to make contact with a fixed part 166 of the frame. A helical spring 167, acting upwardly against lever 152 at a point somewhat in front of pivot pin 155, normally holds the adjustable stop screw 165 in contact with part 166. The spring 167 is in a socket 168 in the bottom of the frame 157 above a ball 169, which is in turn located above and in contact with a screw plug 170 screwed into the bottom of the socket and adapted to be adjusted vertically by a screw driver or other suitable tool passed through a round hole 171 in the bottom of the casing, as shown in Fig. 23. In front of the pivot and preferably in fairly close proximity to bucket 150 the lever 152 is provided with a contact member 172. This contact member is adapted to make and break contact with a similar contact member 173 carried by and depending from the front end of a lever 174, which is preferably pivoted or fulcrumed coincidentally with lever 152. For this purpose the rear portion of lever 174, which is formed of a plate 175 of insulating material, is disposed in the open or slotted portion of lever 152, and is mounted on and pivoted by pivot pin 155, said insulating portion 175 being disposed between cheek portions 176 of the post carrying the pivot pin. The insulating portion or plate 175 is continued forward into the metallic front end portion of lever 174, and is provided with an upwardly extending finger 177, making contact with a lower or cam face 178 on a rotary member 179, having a gear wheel 180 integral therewith, said gear wheel being rotatable in a horizontal plane, and held in position on a post or bearing 181 of the frame by a screw member 182. Meshing with the gear portion 180 is a gear wheel portion 183 formed integral with a wheel member 184 having a hub 185 with a diametrical slot 186. The slot 186 is adapted to be engaged by a key portion 187 formed at the lower end of an operating shaft 188, said key portion 187 preferably being created by bending up opposite lugs on shaft 188. The lower end of shaft 188 rests in slot 186, and at its upper end, as shown in Fig. 5, shaft 188 has a similarly formed diametrical key 189 engaging a correspondingly shaped slot 190 in the operating disk K, whereby rotation of member K will cause rotation of shaft 188. The upper end portion 191 of shaft 188 is of reduced cross-section, and has a bearing 192 in the upper wall of the uppermost casing member 71. This casing member adjacent the slot 73, previously mentioned, has a small metal member 193 as a reinforcement to that portion of the casing which receives the upper end of shaft 188. The member 193 is provided with a spring arm 193ᵃ whose extremity bears against the upper surface of member K to exert friction thereon and hold the member in the position to which it is adjusted. At 193ᵇ is a small depression on the top of the disk in which the end of the spring arm rests when the switch is in the "off" position.

The contact member 173 of lever 174 is normally held in the position shown in Fig. 23 by a coil spring 194 connecting the rear end of lever 174 with the metal frame. Adjacent the forward end of lever 174, the same is provided with a binding screw 195 for the connection of an electric wire 196. For the purpose of establishing good electrical contact between the frame 157 and the rear extremity of lever 152, a binding screw 197 on the frame is connected by a wire 198 with the upper end of stop screw 165, for which purpose the upper part of said stop screw is provided with a clamping nut 199.

The electrical connections of the device are illustrated diagrammatically in Fig. 21, from which it will be noted that one of the line conductors is connected to one of the brushes of the motor, a condenser 200 being in shunt around the motor armature. From the other brush the lead goes to one portion of a split choke coil 201, a condenser 202 being shunted across said choke coil. From the first-mentioned portion of the choke coil the conductor passes to screw 161, so that current is introduced into the metal frame 157. In this manner current is carried to the contact member 172 on lever 152. When there is contact between members 172 and 173, current is carried into the front metal portion of lever 174 to screw 195, conductor 196, and the other side or section of choke coil 201, which in turn is connected with the field 203 of the motor which is connected to the other line conductor, as shown in Fig. 21.

Figure 8:
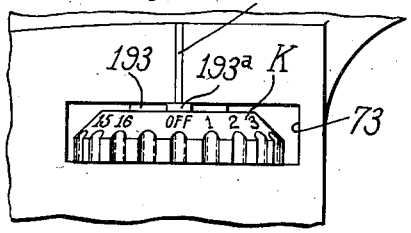
Fig. 8 is a detail showing the speed control knob in side elevation.

When the switch-operating member K is in the "off" position the governor mechanism has the position shown in Fig. 23, the contacts 172 and 173 being slightly separated, and the stop screw 165 being in contact with part 166. It will be noted that in this position the finger 177 of insulating material on lever 174 is engaged in a depression 204 of cam wheel 179. At one side of this depression the cam wheel has a deep shoulder 179ᵃ, and at the opposite side is a shallow shoulder 179ᵇ. The operating disk K has a knurled periphery so that it can be readily rotated by the thumb, and above the knurled portion is a slanting portion on which are designated by suitable characters the "off" position of the disk, as well as (in this instance) sixteen other positions corresponding to angular positions of the disk and to different speeds produced by adjustment of the governor mechanism, these different positions being No. 1, No. 2, No. 3, and so on up to No. 16. These designations on the periphery of the disk are adapted to be brought into registry with an indicating line 73ᵃ on the casing, as shown in Fig. 8.

It is important to note that in my improved mechanism the "off" position of the disk is between the speed position No. 1 and the speed position No. 16, and that from the "off" position the disk can be rotated either in a clockwise direction or a counter-clockwise direction, so as to be moved successively to the positions 1, 2, 3, etc., or to the positions 16, 15, 14, etc.

At the rear end of the casing ventilation openings are provided which permit the ingress of air into the casing at this point, and preferably these openings, which are indicated at 205, are disposed in two series at the respective sides of the casing, said series following arcuate lines whose centers are located at the casing axis. The air entering the casing through these openings is drawn in by the fan or impeller 93 so as to course through the motor and cool the same, and such air is discharged from the casing at the upper intermediate part thereof, that portion of the casing beneath the bucket 150 being closed, but the portion of the casing located above the bucket being provided with a series of air exit openings. Preferably these air exit openings, which are indicated at 206, are at the forward edge portion of the rear casing section, and preferably also these openings 206 are constituted by notches which are formed in the forward edge of the wall of casing section 65 at a number of points in its upper periphery, the notches being closed at their forward ends (so as to form said openings) by joining a part of the front casing section to the rear section. Thus the ventilation and cooling of the motor is provided for, while at the same time the bucket 150 operates in a space sufficiently enclosed to cause outward movement of the bucket with relation to the impeller as air pressure is built up by the latter in the lower part of the casing. As the bucket moves outwardly there is a tendency to separate the contacts 172 and 173, and as the bucket moves inwardly (the air pressure exerted by the impeller being reduced) there is a tendency of contacts 172 and 173 to re-establish the circuit.

In the position of the governor mechanism shown in Fig. 23, the switch-operating disk is in the "off" position, the front end of lever 174 being drawn upwardly by spring 194 to the upper limit of its movement, where, owing to the contact of screw post 165 with part 166, it is impossible for lever 152 to establish contact therewith. Upon movement of the parts to the position shown in Fig. 24 (by movement of switch-operating disk to position 16) the switch parts will be moved to the position giving the highest motor speed for which the device is adjusted. In this position lever 174 is swung by its operating cam into the lowest position to which it can be moved by the cam, and in turn by contacting lever 152 carries the latter to a corresponding position, in which the bucket 150 is at a substantial distance from the periphery of the impeller. In this position of the parts the contacts 172 and 173 close the motor circuit, and the speed of the motor continues to build up until it reaches a high speed, only an even higher speed tendency being effective to separate the contacts by further outward movement of the bucket member, and this temporary separation of the contacts having a tendency to slow down the motor. Supposing, on the other hand, that the switch-operating disk K be turned from the "off" position in a direction opposite to that just indicated, in other words, into the position of speed No. 1, it will be seen that the downward thrust of the cam on the upper lever is very slight, in fact, just sufficient to bring contact member 173 down into contact with member 172, which will start the motor. However, as the motor speed starts to build up, air pressure exerted by the impeller on the bucket will soon force the bucket downwardly, and this will open the circuit. The motor will then have a tendency to slow down, and as it slows down the air pressure against the bucket will decrease, enabling the bucket to move upwardly to re-establish the circuit as soon as the pressure against the bucket reaches a predetermined low value. In this manner the motor circuit is interrupted and re-established at intervals as the air pressure in the lower part of the motor casing fluctuates, the effect being to cause the motor to operate at a substantially constant speed.

In a similar manner the motor will be automatically controlled when the switch-operating member is in position No. 2, the speed in this case being somewhat higher than speed No. 1, and speed No. 3 being somewhat higher than No. 2, and so on.

It is of considerable importance that the switch-operating member can be moved directly from the "off" position to the position giving the highest speed, or to the position giving the lowest speed, without the necessity of going through the intermediate speed positions in reaching high speed, as this greatly increases the convenience of operation. It is also of importance that a comparatively large number of intermediate speeds are provided, as required for different operations performed by the device, and that, for example, in adjusting the switch to speed No. 13 the switch member can be moved from "off" through positions 16, 15 and 14 to position 13, instead of having to go up from 1 to 13, as would otherwise be the case.

If the setting of the switch is such as to make the motor speeds either higher or lower than those desired, the setting may be changed by introducing a small tool through opening 171 in the bottom of the casing so as to adjust plug 170 and thereby change the pressure exerted by spring 167 on switch lever 152.

The electric conductors extending to the motor from the usual attachment plug (not shown) are preferably housed in a flexible sleeve 207 extending into the rear portion of the casing at one side of the latter, the casing having a slight enlargement 208 where the sleeve passes into the same.

It will be noted that at the rear extremity of lowermost front casing portion 69, the curved wall of the latter is provided adjacent its inner face with inwardly projecting lugs 209, as shown particularly in Fig. 13. The wall of part 70 is provided with inwardly extending flanges 210 at its rear end, and the curved wall of part 71 is provided with flanges 211, while at the upper central part of its curved wall the part 71 is provided with a downwardly projecting key part 212. The front end portion of rear casing section 67 is provided with a plurality of forwardly extending locking lugs, as shown more particularly in Figs. 9, 10, 15 and 16. At the top of this section are locking lugs 213 between which lug 212, previously mentioned, is adapted to fit.

At the sides of section 67 are a plurality of lugs 214, which are grooved on their outer surfaces, as indicated at 215. Section 67 is also provided at certain points with lugs 216 having plain or ungrooved outer surfaces.

After the motor has been built into section 67, the latter is ready for assemblage with the other parts of the casing. The front lower part of the casing has the motor switch and its adjuncts installed therein, and gear 102 is placed in position. This part of the casing can then be assembled to section 67, and in this operation the lugs 214 will be passed between the lugs 209 and then turned so as to interlock therewith as part 69 comes to its final position. In this assemblage worm 98 will mesh with gear 102. In the next operation gear 99 will be placed in position relative to worm 97, and casing part 70, with the elements carried thereby, lowered into position, with the flanges 210 engaged with lugs 214, and at the same time upper casing part 71 can be placed in position, with its flanges 211 engaging the lugs 214, and with its central lug 212 engaging lugs 213 in the manner shown in Fig. 9. The casing parts are then in a position to be locked together by suitable screw bolts, which, being inserted from the bottom of the casing, are substantially invisible. At the front end is a screw 217, which passes through lower front part 69 into a socket 218 in intermediate front member 70. At one side of the longitudinal center line of the casing, screws 219, having their lower headed portions in sockets 220 in portion 69, screw into lugs in part 70, and at the opposite side of the center line screws 221, having associated therewith spacing sleeves 222, and having their headed ends in sockets 223 of part 69, engage at their upper ends threaded sockets 224 in the upper wall or web of part 70. Preferably parts 70 and 71, before being mounted on part 69, are fastened together by small screws 225 engaging threaded sockets adjacent the ends of a wall 226, which extends across part 71 intermediate of its ends, and is cut away at 227 so as to fit about the upper portion of the power socket.

It will be seen that the general organization of the main parts or members of the device is such as to lend itself to a stream-lined device, and that the casing, being smooth and substantially devoid of projections, can easily be kept clean. The agitators are also of such a construction that they can be readily cleaned, and there is a notable absence of angles and recesses in which bacteria can lodge. The casing of the motor member, which is made of Bakelite or other suitable plastic material, can be readily formed in the desired shape so as to be attractive in appearance, and it is light in weight and also non-rusting and resistant to the acids of fruit and vegetable juices, etc., which have no effect thereon.

I do not claim herein any features of electric motor construction as the same are claimed in my application Serial No. 267,371, filed April 12, 1939, nor do I claim herein the means for controlling the vertical adjustment of the turntable as the same are claimed in my application Serial No. 379,617, filed February 19, 1941.

It is a distinct advantage of my device that it is provided with a power socket at the front end of the casing, built within the lines of the casing so as not to have projecting parts, and in connection with which the use of an external clamping screw or the like for fastening the appliance in the socket is not required. It is also an advantage that the power socket is readily accessible at all times without the need of disturbing the handle for the motor member. The construction is also simplified and improved by providing the power socket with grooves having angularly related portions, with the pins or studs on the accessory appliance forced into the ends of the inner slot portions by the rotation of the power shaft.

While I have described a preferred embodiment of the invention, it is to be understood that the latter is susceptible of numerous different embodiments, and that many modifications and changes in the construction can be made without departing from the principles of the invention or the scope of the claims.

What I claim is:

1. A kitchen utility device comprising a combined motor and gear casing divided transversely into a rear section and a front section, the front section in turn being divided into a lower part, an upper part and an intermediate part, a motor in the rear section, beater-driving gears in the front section, an upwardly extending reamer shaft in the front section, a power shaft driven by the reamer shaft, and a power socket associated with the power shaft and open at the front end of the casing, said power socket being located partly in the upper part of the front section and partly in the intermediate part of said section.

2. A kitchen utility device comprising a combined motor and gear casing divided transversely into a rear section and a front section, the front section in turn being divided into a lower part, an upper part and an intermediate part, a motor in the rear section, beater-driving gears in the front section, an upwardly extending reamer shaft in the front section, a power shaft driven by the reamer shaft, and a power socket associated with the power shaft and open at the front end of the casing, said power socket being located partly in the upper part of the front section and partly in the intermediate part of said section, and said upper part of the front section having an integral enlargement with a handle extending rearwardly therefrom.

3. A kitchen utility device comprising a combined motor and gear casing divided transversely into a rear section and a front section, the front section in turn being divided into a lower part, an upper part and an intermediate part, a motor in the rear section, beater-driving gears in the front section, an upwardly extending reamer shaft in the front section, a power shaft driven by the reamer shaft, a power socket associated with the power shaft and open at the front end of the casing, said power socket being located partly in the upper part of the front section and partly in the intermediate part of said section, and said upper part of the front section having an integral enlargement with a handle extending rearwardly therefrom, and a tab portion extending forwardly and downwardly therefrom and constituting the front wall of the casing around the power socket.

4. A kitchen utility device comprising a combined motor and gear casing divided transversely into a rear section and a front section, said sections having at their adjacent edges means whereby they are interlocked with each other, said front section comprising superposed parts separably connected, a motor in the rear section, gear mechanism in the front section, the superposed parts of said front section including a separate intermediate part, and a juicer shaft and power shaft assembly carried by the intermediate part and operable from said gearing.

5. A kitchen utility device comprising a combined motor and gear casing having an electric motor in the rear part and gear-driven agitators depending from the front part, the front part of said casing being of smooth rounded shape at the forward end and comprising three separate portions separably interconnected, namely, a lower portion, an intermediate portion and an upper portion all together providing said smooth rounded shape, said upper portion having a rearwardly directed handle spaced upwardly from the body of the casing, and said front part of the casing having an interior motor-driven power shaft and a power socket substantially within the lines of the casing open at the front end of the latter, said power socket being horizontal and located partly in said upper portion and partly in said intermediate portion.

6. In a kitchen utility device of the type in which a power-driven agitator member having a handle by which it can be lifted is removably supported on the upper end of a standard, the combination of an agitator member casing formed at its lower rear portion with a shallow exterior groove, a standard-supported bracket part having an open upper mouth whose edges fit in said groove at the respective sides thereof, and a pin having a lower end secured within the bracket and an upper rounded end projecting upwardly out of the bracket and into a socket formed in the lower part of the agitator member casing.

RICHARD H. JORDAN.